(12) United States Patent
Israeli

(10) Patent No.: US 10,104,958 B2
(45) Date of Patent: *Oct. 23, 2018

(54) SUSPENSION DEVICE

(71) Applicant: Robert Israeli, New York, NY (US)

(72) Inventor: Robert Israeli, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,001

(22) Filed: Dec. 14, 2017

(65) Prior Publication Data

US 2018/0103755 A1 Apr. 19, 2018

Related U.S. Application Data

(63) Continuation-in-part of application No. 15/177,040, filed on Jun. 8, 2016, now Pat. No. 9,869,425, which is a continuation-in-part of application No. 14/317,933, filed on Jun. 27, 2014, now abandoned.

(60) Provisional application No. 61/841,037, filed on Jun. 28, 2013.

(51) Int. Cl.
*F16M 13/02* (2006.01)
*G09F 19/00* (2006.01)
*G09F 7/18* (2006.01)
*A47B 23/00* (2006.01)
*A47B 23/06* (2006.01)
*F16M 11/10* (2006.01)
*F16M 11/18* (2006.01)
*F16M 11/04* (2006.01)

(52) U.S. Cl.
CPC ............. *A47B 23/06* (2013.01); *F16M 11/10* (2013.01); *F16M 11/18* (2013.01); *F16M 13/027* (2013.01); *A47B 23/007* (2013.01); *F16M 11/046* (2013.01); *F16M 13/022* (2013.01)

(58) Field of Classification Search
CPC .. F16M 13/027; F16M 13/022; F16M 11/046; F16M 11/10; F16M 11/18; A47B 23/007; A47B 2023/008; A47B 23/07; A47B 2023/08; A47B 23/06; A63H 3/006; G09F 19/02
USPC ............ 248/205.1, 323, 328, 329, 343, 489; 211/17, 117, 90.04; 446/227; 40/411
See application file for complete search history.

(56) References Cited

U.S. PATENT DOCUMENTS

| 1,187,845 A | 6/1916 | Kolb |
| 1,202,166 A | 10/1916 | Corbett |
| 1,325,320 A | 12/1919 | Gosso |
| 3,872,972 A | 3/1975 | Cummins et al. |

(Continued)

FOREIGN PATENT DOCUMENTS

| EP | 1624430 A2 | 2/2006 |
| GB | 2200491 A | 8/1988 |

(Continued)

OTHER PUBLICATIONS

Non-Final Office Action issued for corresponding U.S. Appl. No. 15/177,040 dated Oct. 3, 2016.

(Continued)

*Primary Examiner* — Tan Le
(74) *Attorney, Agent, or Firm* — Myers Wolin, LLC

(57) ABSTRACT

A suspension device for suspending a display unit comprises a fixation element for securing the suspension device to a support surface, and a plurality of suspension members for removably receiving the display unit and suspending the display unit from the fixation element.

18 Claims, 4 Drawing Sheets

(56) References Cited

U.S. PATENT DOCUMENTS

| | | | |
|---|---|---|---|
| 4,376,855 A | 3/1983 | Ames | |
| 4,736,855 A | 4/1988 | Arakawa | |
| 5,176,266 A | 1/1993 | Gillet | |
| 6,161,702 A | 12/2000 | Campbell | |
| 6,637,714 B1 | 10/2003 | Hall | |
| 6,851,376 B2 | 2/2005 | D'Agostino | |
| 7,249,743 B1 | 7/2007 | Stearns | |
| 7,450,372 B2 | 11/2008 | Lin et al. | |
| 8,006,453 B2 | 8/2011 | Anderson | |
| 8,033,529 B2 | 10/2011 | Boda et al. | |
| 8,390,411 B2 | 3/2013 | Lauder et al. | |
| 8,672,146 B1 | 3/2014 | Cole | |
| 9,057,510 B2 * | 6/2015 | Karlsson | F21V 21/096 |
| 9,869,425 B2 * | 1/2018 | Israeli | F16M 13/027 |
| 2006/0086018 A1 | 4/2006 | Cheng | |
| 2006/0113446 A1 | 6/2006 | Parsons | |
| 2006/0207952 A1 * | 9/2006 | Timmons | A47F 5/0892 211/85.3 |
| 2008/0134554 A1 | 6/2008 | Pitcher et al. | |
| 2009/0256044 A1 | 10/2009 | Miller et al. | |
| 2010/0148028 A1 * | 6/2010 | Hand | A47F 5/0892 248/330.1 |
| 2012/0024917 A1 | 2/2012 | Case et al. | |
| 2012/0308164 A1 | 12/2012 | Hudson | |
| 2013/0048809 A1 | 2/2013 | Jacobson | |
| 2014/0315467 A1 | 10/2014 | Smith | |
| 2015/0028172 A1 | 1/2015 | Israeli | |

FOREIGN PATENT DOCUMENTS

| | | |
|---|---|---|
| JP | S52119022 A | 10/1977 |
| JP | 2003225154 A | 8/2003 |
| WO | 2009109101 A1 | 9/2009 |

OTHER PUBLICATIONS

Non-Final Office Action issued for corresponding U.S. Appl. No. 14/317,933 dated Jul. 2, 2015.

Final Office Action issued for corresponding U.S. Appl. No. 14/317,933 dated Feb. 9, 2016.

* cited by examiner

SUSPENSION DEVICE

CROSS-REFERENCE TO RELATED APPLICATIONS

This application is a continuation in part of U.S. patent application Ser. No. 15/177,040, filed Jun. 8, 2016, which is a continuation in part of U.S. patent application Ser. No. 14/317,933, filed Jun. 27, 2014, which takes priority from U.S. Provisional Patent Application No. 61/841,037, filed Jun. 28, 2013, the entirety of each of which are incorporated by reference herein.

FIELD OF THE INVENTION

The invention relates to a suspension device generally, and more particularly to a device and system for suspending, in one embodiment, a display unit such as a personal electronic device for comfortable, hands-free viewing.

BACKGROUND

Various personal display units, such as smart phones, tablet computers, electronic readers, and the like, are generally planar, lightweight devices that are used in a variety of environments and settings. Several features of such devices make them portable by nature, in that they often have features such as wireless network and internet connectivity, increased storage capacity (memory) and batteries with ever increasing lifespans. While such devices are typically used in situations for which traditional personal computers such as desktops, laptops and notebook computers are inappropriate or unwieldy, the increased functionality embedded in some devices have made them near replacements for not only personal computers, but also traditional media delivery devices like televisions, newspapers, magazines and books.

Traditionally, personal display devices such as tablets and like are handheld devices that are used for both inputting data by typing or the like, and outputting data by reading or viewing. However, certain devices are used more passively for viewing rather than inputting, such as for viewing audio visual content that is stored on the device or streamed through the device via a local or wide area network. Where a device is used more passively, such as for watching a movie for example, or where a user might desire to multi-task and do other things while viewing the device, it might be difficult or undesirable to have to constantly hold such a device. For example, a user may use such a display device for viewing a movie in bed, and holding such a device at a comfortable viewing angle for a substantial period of time may be tiresome or uncomfortable. Similarly, a user may want to watch a video on such a display unit while exercising or cooking, or may simply require a comfortable viewing angle for such a display at a workstation.

Traditional mounts and supports for such devices generally require the use of a specialized case for the device, or a surface on which to place the device.

SUMMARY

One embodiment of a suspension device for suspending a display unit comprises a fixation element for securing the suspension device to a support surface, and a plurality of suspension members for removably receiving the display unit and suspending the display unit from the fixation element.

DETAILED DESCRIPTION OF THE PREFERRED EMBODIMENTS

Figure 1:
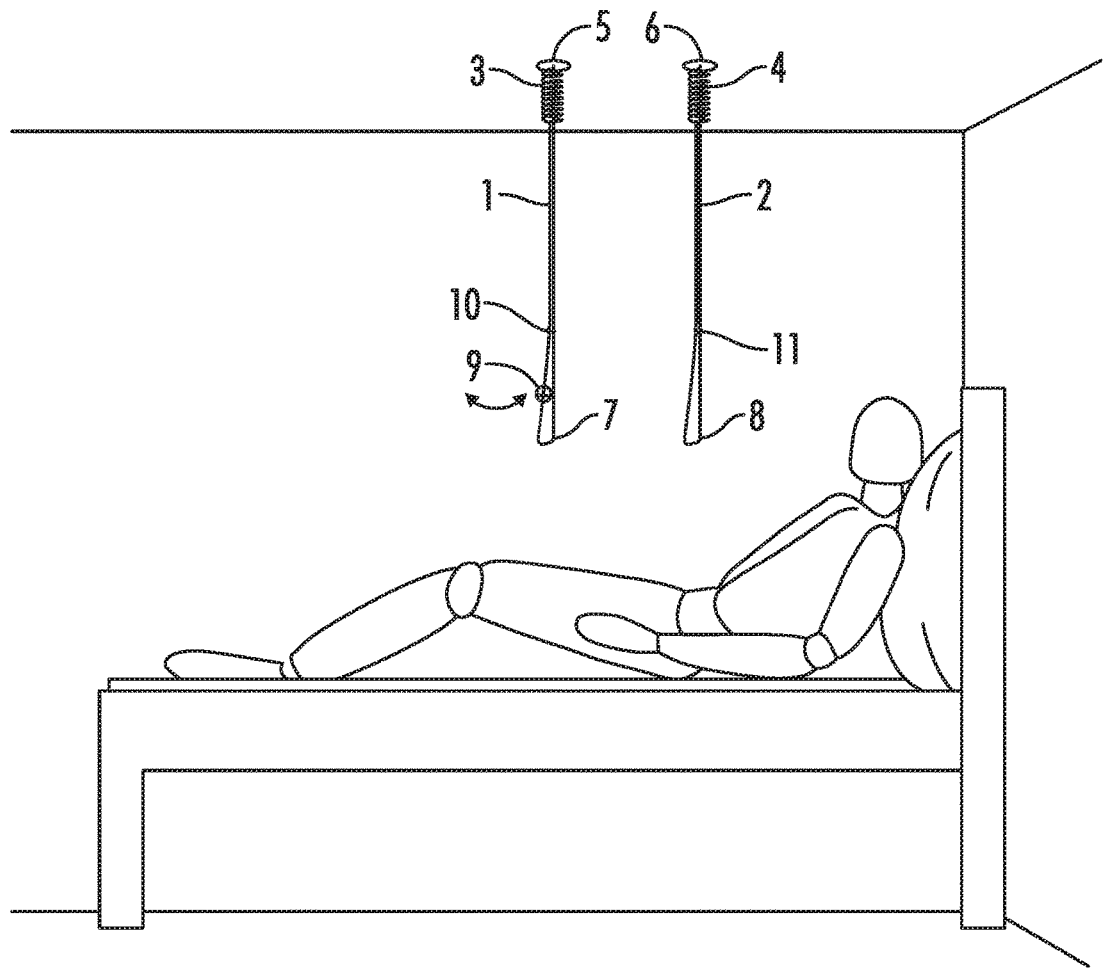
FIG. 1 illustrates one embodiment of a suspension device as used in one type of environment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
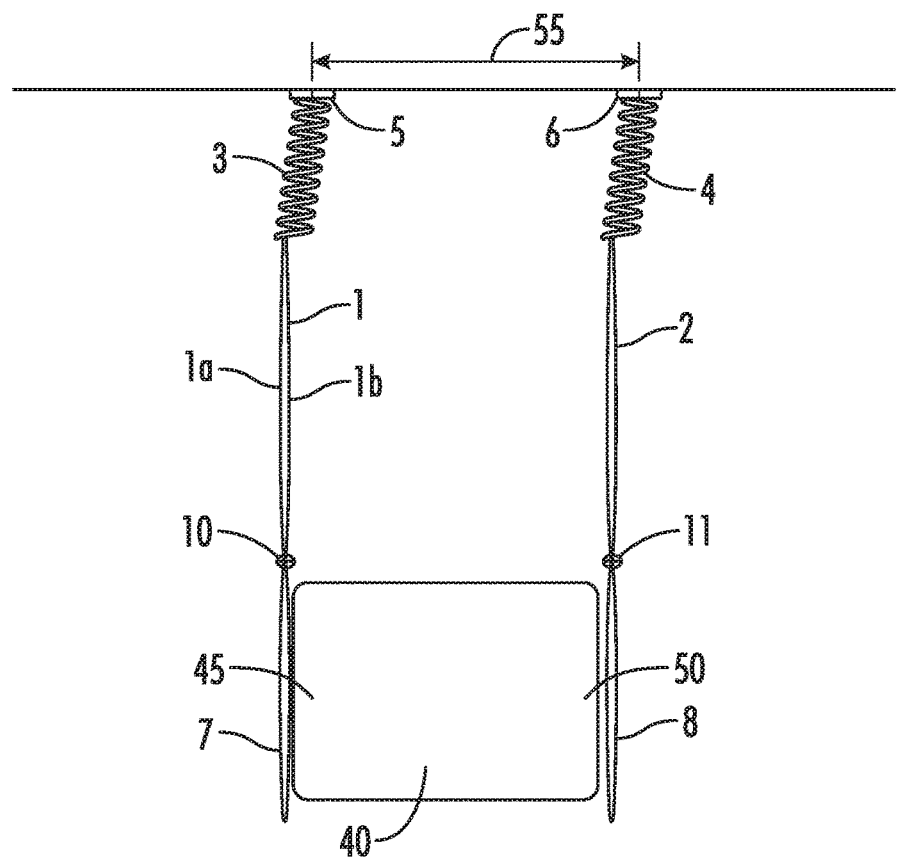
FIG. 2 is a diagrammatic view of the suspension device of FIG. 1 for supporting a personal display unit.

FIGS. 1-2 illustrate one embodiment of the suspension device of the present disclosure for suspending a display unit 40 (FIG. 2) as used for viewing by a user. The embodiment shown comprises a plurality of fixation elements 5, 6 for attachment of the suspension device to a support surface such as a ceiling or the like, a plurality of suspension members 1, 2, such as cables or the like, for suspending the display unit 40, and retainers such as loops 7, 8 for holding the display unit 40. In the illustrated embodiment of FIGS. 1-2, the loops 7, 8 have adjustable openings defined by retainers or locking clips 10, 11 placed at the top of the loops 7, 8, for retaining the display unit 40 inside loops 7, 8.

The cables 1, 2 may be made of various materials, including twine, fabric, metal, plastic, rubber, or combinations of the same. Other materials are contemplated. In some embodiments, the cables 1, 2 are transparent, substantially transparent, or very thin so as to be nearly invisible. In one embodiment, the cables may be formed from clear plastic such as fishing wire, for example. The fixation elements 5, 6 may be, for example, hooks connected using adhesives, suction cups, or hardware, such as screws. In some embodiments, the hooks are connected using removable adhesives so that the fixation is removable if the user decides to uninstall and/or relocate the suspension device. It will be understood that fixation elements other than hooks are contemplated, including directly fixing the cables to a ceiling using, for example, tape, adhesives, or hardware, among other possibilities. In some embodiments, the fixation elements 5, 6 may be replaced by a single fixation element having a single hook to which both the first cable 1 and the second cable 2 may be attached, or it may be a single fixation element having multiple hooks with the hooks spaced apart by a predetermined amount. As illustrated in FIG. 2, when installing the fixation elements 5, 6, a user may space the first element 5 from the second element 6 deliberately so that the first cable 1 hangs substantially parallel with the second cable 2, and spaced apart by a predetermined amount 55 such that, for example, a specified display unit, such as tablet 40, fits into the device properly and such that the device does not swivel substantially once the display unit is placed within it. After installing the fixation elements 5, 6 a user may suspend the cables 1, 2 from the corresponding fixation elements.

The embodiment of FIG. 1 further comprises a tilter 9 for adjusting the orientation of the device for more comfortable viewing by a user. When a display unit 40 (FIG. 2) is mounted within the suspension device of FIG. 1, a user may prefer that the display be angled towards them for easier reading. In one embodiment, the tilter 9 can be a clip that may be applied to the loops 7, 8 to interrupt and vary the natural hanging orientation of the display unit. It will be understood that while a single tilter 9 is shown in loop 7, other embodiments may have tilters placed in each of the loops for stabilizing the display unit in a user selected orientation. Or multiple tilters may be strategically located and positioned to provide multiple adjustment points. While the tilter shown is a clip, the tilter may be any feature that shifts the orientation of the device away from its naturally hanging orientation. In certain alternative embodiments, for example, the suspension members 1, 2 may incorporate a shelf (not shown) suspended from the terminal ends of the cables 1, 2, and the tilter may be an adjustable platform relative to the shelf, or a device for adjusting the angle of the shelf or the angle of the device relative to the shelf. The tilter may also be, for example, an angled notch in the surface of such a shelf for supporting the display unit.

FIG. 2 shows a display unit 40 having a front face, a first edge 45 and a second edge 50, wherein the first edge 45 is supported within loop 7 and the second edge 50 is supported within loop 8. The adjustable clips 10, 11 restrict or vary the loop openings and secure against the first and second edges 45, 50 to secure the display unit 40 within the loops 7, 8. In the embodiment shown, the clips 10, 11 are adjusters for adjusting the sizes of the first loop 7 and the second loop 8 respectively. It will be understood that the clips 10, 11 may also be, for example, washers, rubber sleeves, or other slidable, detachable, or otherwise adjustable elements for modifying the size of the loops 7, 8 relative to a retained display unit. As shown in FIG. 2, the entire length of the cable 1 may comprise a first length of cable 1a and a second length of cable 1b, and the size of loop 7 relative to the portion of cable 1 not forming loop 7 may be determined entirely by the location of clip 10. In some embodiments, however, the loops 7, 8 are at one end of the cable 1, 2, and the remaining length of the cables 1, 2 is not doubled. In some embodiments, the loops 7, 8 are separate lengths of cordage independent of cables 1, 2 and attached to the end of the cables. In some embodiments, the locking clips 10, 11 are preinstalled on the cables 1, 2, and in others, the locking clips are added by the user to secure the device. Other constructions are contemplated.

Figure 3:
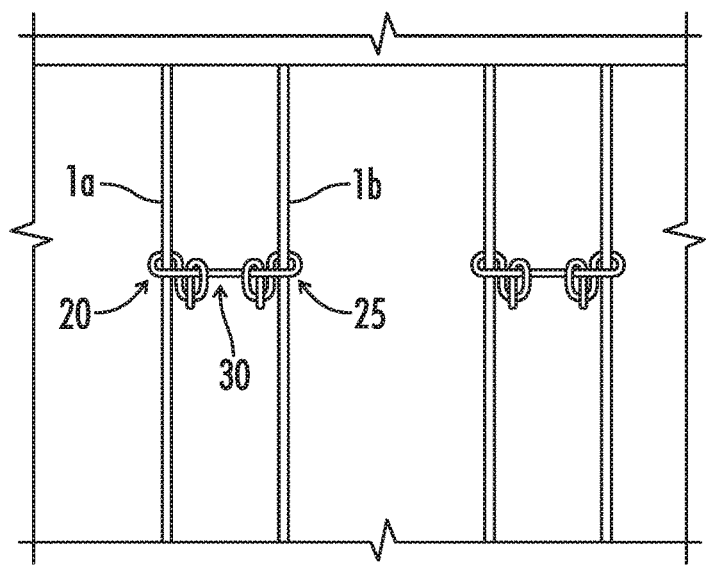
FIG. 3 illustrates one embodiment of a retaining feature for use with a suspension device in accordance with this disclosure.

FIG. 3 shows one embodiment of a retainer 30 for modifying the size of the loops 7, 8. When a loop is formed within a single cable 1 defined by a first part of the cable 1a and a second part of the cable 1b, retainer 30 may comprise a flexible length of cordage, such as the same type of cord as that forming cable 1. The retainer 30 is then applied within the loop of cable 1 by forming a first slipknot 20 around the first part of the cable 1a and a second slipknot 25 around the second part of the cable 1b as shown in FIG. 3, leaving the retainer 30 slidably connected to the loop 7 (FIG. 2) of cable 1. It will be understood that retainer 30 may be formed of a different material, and may be connected using, for example, clips, washers, or bearings that may slide along the length of cable 1.

In the embodiments of FIGS. 1-2, the cables 1, 2 are each connected to the fixation elements 5, 6 by way of springs 3, 4 that may function as a retracting device for either partially or fully retracting the cables 1, 2 when the display unit is removed. The springs 3, 4 may be fixed to the fixation elements 5, 6 and the cables 1, 2 may then be suspended from the springs 3, 4. Alternatively, the springs 3, 4 may be formed as portions of the cables 1, 2. It will be understood that the springs 3, 4 may be replaced with, for example, retracting reels or an elastic segment, or other retraction device. In some embodiments, the cables themselves are coiled or at least partially, and retract themselves when the weight of the display unit is removed. In some embodiments, the fixation elements 5, 6 are configured to mate with the loops 7, 8 for storage when the device is not in use. Where the loops 7, 8 are replaced with a different connector element for holding the display unit, such as a shelf, such a connector element may be configured to mate with the fixation elements 5, 6 as well.

Figure 4:
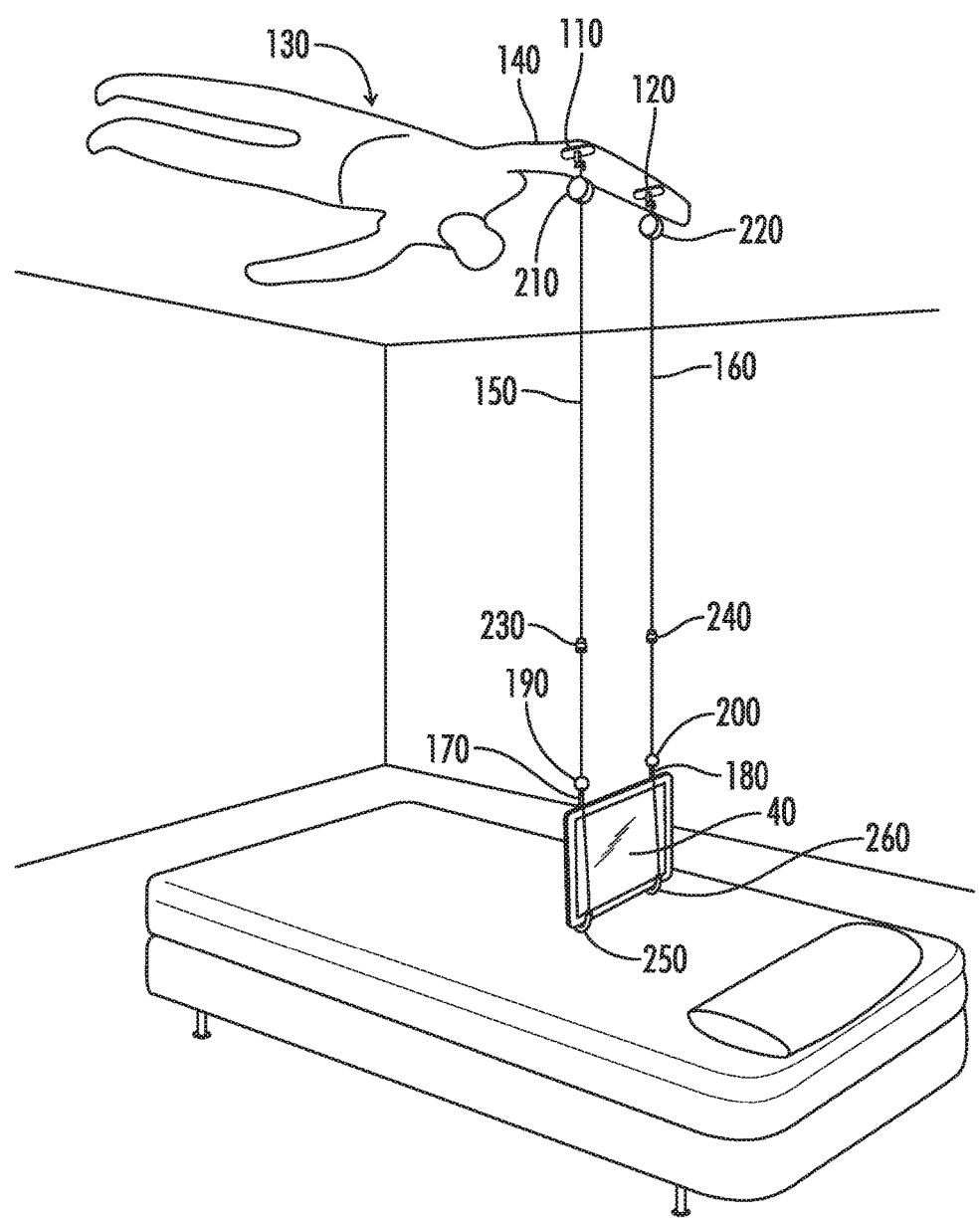
FIG. 4 illustrates a second embodiment of a suspension device for supporting a personal display unit.
Figure 5:
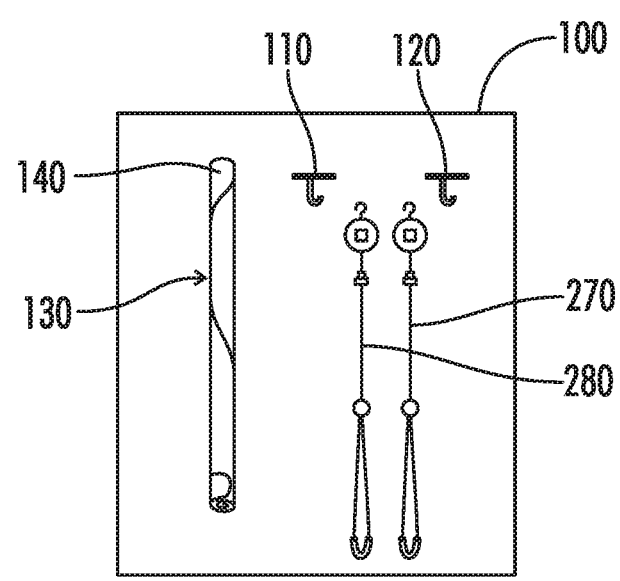
FIG. 5 shows a kit for implementing the suspension device of FIG. 4.

FIG. 4 illustrates a second embodiment of a suspension device for supporting a personal display unit 40, and FIG. 5 shows a kit 100 for implementing the suspension device of FIG. 4. As shown, the embodiment comprises a plurality of fixation elements 110, 120 for attachment of the suspension device to a support surface, such as a ceiling. The embodiment further comprises ceiling art 130, such as a decal or a paint pattern, which is applied to a segment of the ceiling, and the fixation elements 110, 120 are applied at a suspension location 140 within the ceiling art 130. The suspension location 140 may be a particular element within the ceiling art 130. For example, the ceiling art 130 may be in the shape of a human figure, and the suspension location 140 may then be a hand of the human figure to give the appearance of the human figure holding the fixation elements 110, 120. As shown, the ceiling art 130 is a two dimensional graphical artwork, such as a painting, print, photograph, or any other illustration. Such two dimensional graphical artwork may be, for example, the humanoid figure shown, or it may take a variety of other visual forms, such as a corporate logo design, animal, or landscape.

The suspension device may further comprise a plurality of suspension members 150, 160, such as cables or the like, for suspending the display unit 40, and retainers 170, 180, such as loops, for holding the display unit. The size of the retainers 170, 180 may be adjustable using adjusters 190, 200 in order to adapt the retainers to different size display units 40.

The suspension members 150, 160 are each connected to the fixation elements 110, 120 by retracting elements 210, 220, such as retracting reels, and may include stoppers 230, 240 to limit how far the suspension members are retracted. In some embodiments, the stoppers 230, 240 may be adjustable so that a user can set the device to be reachable when retracted by setting a certain height to which it retracts. Further, the retainers 170, 180 may be provided with grippers 250, 260 for supporting the bottom of the display unit 40 and preventing it from slipping during use.

When provided as a kit 100, several elements may be combined prior to providing to a user, such that those elements need not be assembled. For example, a kit may include a ceiling art 130 decal, fixation elements 110, 120, and combinations of the remaining components 270, 280. Accordingly, when a user acquires such a kit, the user may install the suspension device by first applying the ceiling art 130 to a ceiling, fixing the fixation elements 110, 120, at the suspension location 140 within the ceiling art 130, and hanging the remaining components 270, 280 from the fixation elements. The user may then place a display unit 40 in the retainers 170, 180 such that it rests on the grippers 250, 260 and adjust the adjusters 190, 200 so that the display unit is held in place.

The device disclosed may be used to, for example, suspend a tablet or other display unit while reading in bed, exercising, working, cooking, or any number of other activities where a user may prefer not to use their hands. In the embodiments shown, a user may suspend a display unit using loops acting as supporting devices combined with clips acting as retaining devices to prevent the display units from falling from the device.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A suspension device for suspending a display unit for creating the appearance of a floating display unit comprising:
   a two dimensional graphical artwork for applying to a segment of a support surface, wherein the two dimensional graphical artwork is an image of a logo design, landscape, or animal form;
   at least one fixation element for securing the suspension device to the segment of the support surface; and
   a plurality of suspension members for removably receiving the display unit and constructed for suspending the display unit from the at least one fixation element in such a manner so as to create the appearance of a floating display unit;
   each suspension member further comprising a retainer for retaining the display unit relative to the suspension member,
   wherein each suspension member is substantially transparent so as to create the appearance of a display unit floating below the two dimensional graphical artwork; and
   wherein the securing of the suspension device to the segment of the support surface in combination with the application of the two dimensional graphical artwork to the segment of the support surface visually associates the display unit with the two dimensional graphical artwork so as to create the appearance of a consistent design between the two dimensional graphical artwork and the display unit.

2. The device of claim 1, wherein the retainer on each suspension member is a loop formed at an end of the suspension member and that further comprises an adjustable opening defined by a movable restrictor.

3. The device of claim 2, wherein the movable restrictor is slidably connected to the suspension member.

4. The device of claim 3, wherein the movable restrictor is slidably connected to the suspension member at two points.

5. The device of claim 4, wherein the movable restrictor is connected to the suspension member with two slip knots.

6. The device of claim 1, further comprising a tilter incorporated into at least one suspension member for adjusting an angle of the display unit.

7. The device of claim 6, further comprising a tilter detachably fixed to each retainer.

8. The device of claim 1, wherein the fixation element is configured to retain the suspension members for storage.

9. The device of claim 1, further comprising a fixation element associated with each suspension member.

10. The device of claim 1, wherein the plurality of suspension members are at least partially retractable toward the at least one fixation element.

11. The device of claim 10 each suspension member further comprising a retracting portion.

12. The device of claim 11, wherein the retracting portion is a spring.

13. The device of claim 1, further comprising at least one retractor fixed to the at least one fixation element.

14. The device of claim 13, wherein the at least one retractor is two retracting reels for retracting the suspension members.

15. The device of claim 13, wherein the at least one retractor is at least one spring situated between the fixation element and the suspension members.

16. The device of claim 1, wherein the fixation element is at least one of a hook, removable hook, suction cup, adhesive, or removable adhesive, or a combination thereof.

17. The device of claim 1, wherein a length of each suspension member is adjustable.

18. A suspension device for suspending a display unit for creating the appearance of a floating display unit comprising:
   a decal comprising a two dimensional graphical artwork for applying in a flattened configuration to a planar segment of a support surface;
   at least one fixation element for securing the suspension device to the planar segment of the support surface; and a plurality of suspension members for removably receiving the display unit and constructed for suspending the display unit from the at least one fixation element in such a manner so as to create the appearance of a floating display unit;

each suspension member further comprising a retainer for retaining the display unit relative to the suspension member, wherein each suspension member is substantially transparent so as to create the appearance of a display unit floating below the two dimensional graphical artwork; and wherein the securing of the suspension device to the planar segment of the support surface in combination with the application of the decal to the planar segment of the support surface visually associates the display unit with the two dimensional graphical artwork so as to create the appearance of a consistent design between the two dimensional graphical artwork and the display unit.

* * * * *